April 30, 1957     P. R. HEYGEL ET AL     2,790,497
SLITTING MACHINE

Original Filed Dec. 22, 1949     5 Sheets-Sheet 1

INVENTORS
PAUL R. HEYGEL AND
ERNEST G. KALTENBACH
BY
ATTORNEYS

INVENTORS
PAUL R. HEYGEL AND
ERNEST G. KALTENBACH
BY Parrott + Richards

ATTORNEYS

April 30, 1957 P. R. HEYGEL ET AL 2,790,497
SLITTING MACHINE
Original Filed Dec. 22, 1949
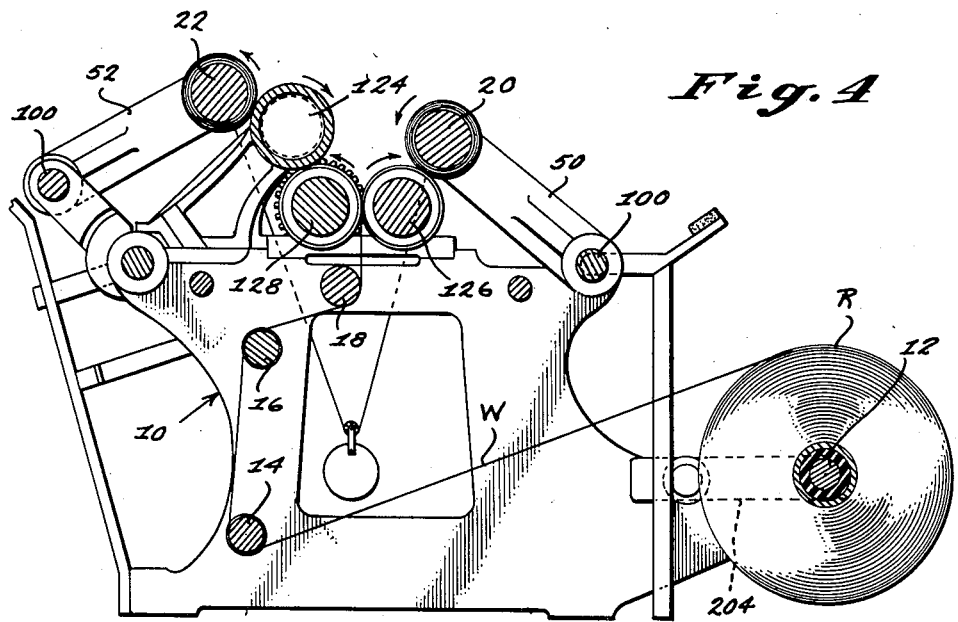
Fig. 4
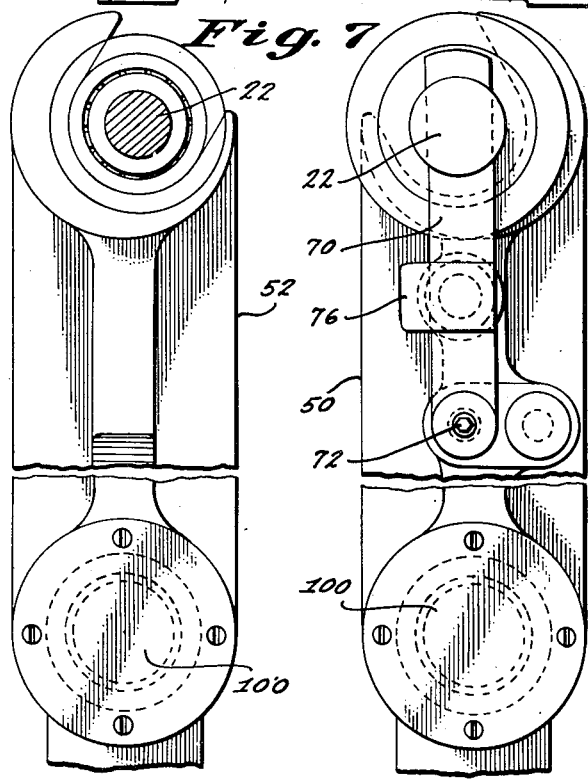
Fig. 7
Fig. 8
INVENTORS
PAUL R. HEYGEL AND
ERNEST G. KALTENBACH
BY
ATTORNEYS

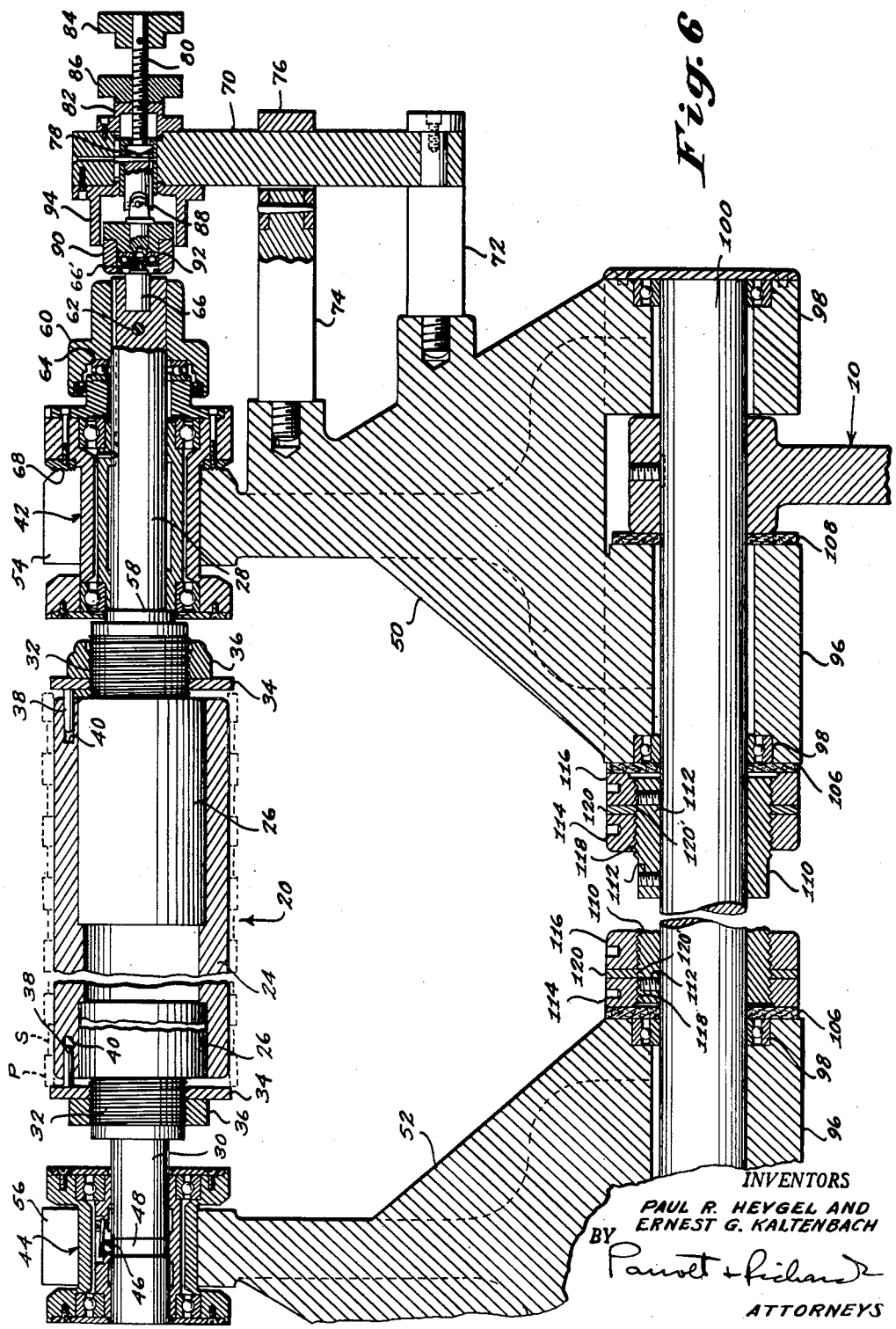

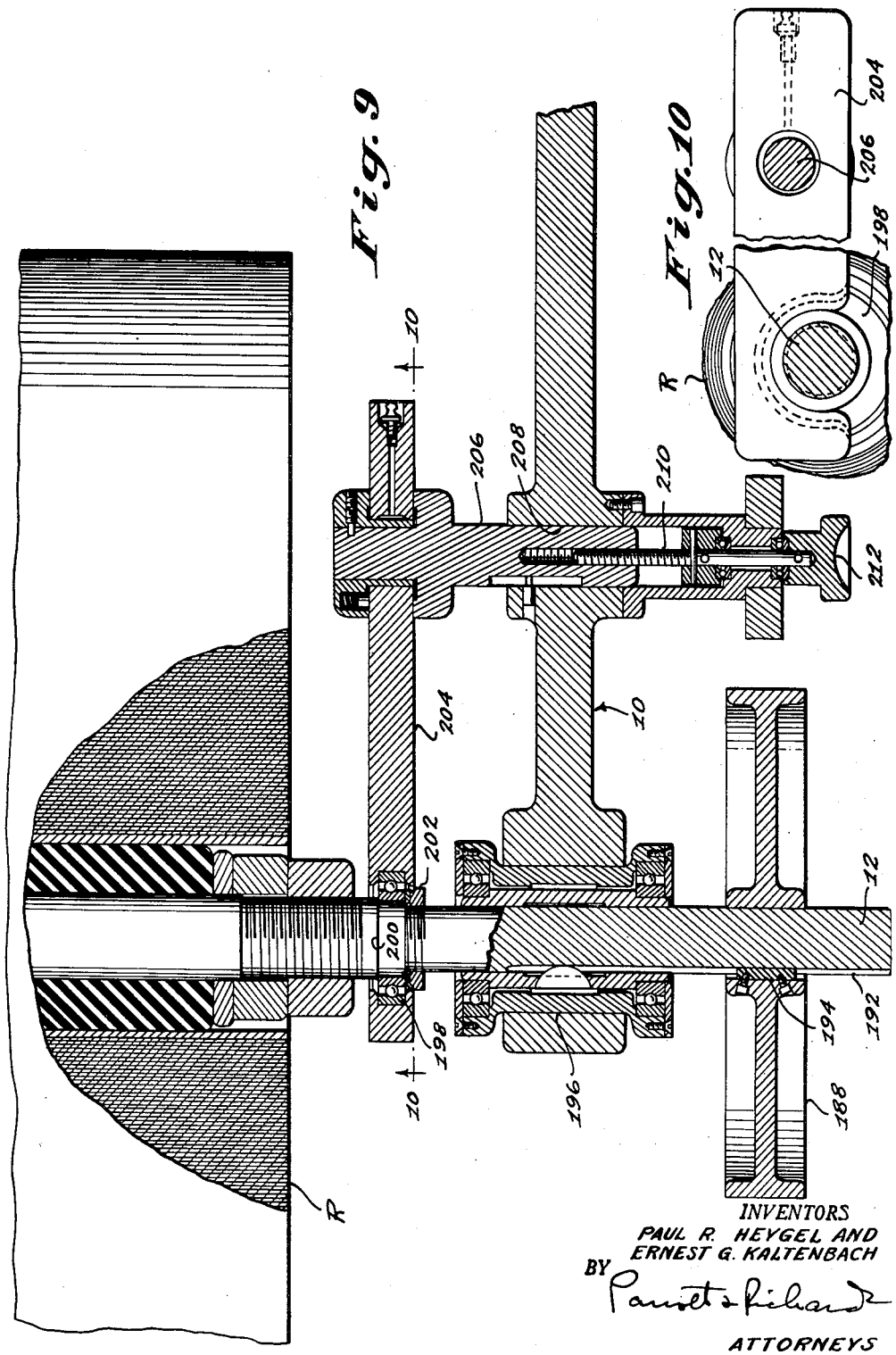

United States Patent Office 2,790,497
Patented Apr. 30, 1957

2,790,497
SLITTING MACHINE

Paul R. Heygel, Asheville, and Ernest G. Kaltenbach, Pisgah Forest, N. C., assignors, by mesne assignments, to Olin Mathieson Chemical Corporation, a corporation of Virginia Original application December 22, 1949, Serial No. 134,574, now Patent No. 2,711,861, dated June 28, 1955. Divided and this application August 30, 1954, Serial No. 456,172

7 Claims. (Cl. 164—65)

This invention relates particularly to slitting machines such as are used to slit paper webs and the like into a plurality of smaller web portions. The improved slitting machine features provided according to the present invention may also in general be employed to advantage in other types of web processing equipment as will appear more in detail below.

This is a division of our copending application Serial No. 134,574, filed December 22, 1949, now U. S. Patent No. 2,711,861.

One of the principal difficulties encountered in processing web material, especially when slitting of a paper web is involved, is the problem of maintaining adequate lateral alignment of the various operating elements so that the web material may be run smoothly and evenly from each operating element to the next one. In the processing of a web of cigarette paper, for example, to slit the web and rewind the slit web portions into bobbins for use in a cigarette making machine, it is necessary to rewind the bobbins very exactly in order to form them straight and true enough for satisfactory use on the cigarette making machine, and this cannot be done unless the lateral alignment of the slitting machine operating elements can be maintained very closely. This problem is made further difficult by the fact that some of the operating elements, such as the core shafts, must be arranged in the machine so that they are removable which precludes the use of any permanently fixed mounting arrangement.

According to the present invention these difficulties are overcome in a particularly effective manner by providing lateral locating means or devices for each of the operating elements which are characterized in general by the fact that they maintain the lateral alignment solely with respect to one side of the machine frame. By this arrangement, the relative lateral alignment of the operating elements can be set and maintained with great accuracy, because the alignment of each element is determined at only one point rather than at spaced points, and this arrangement is further exceptionally well adapted for locating the removable operating elements with ease and facility.

Another important feature of the present invention is the provision of an auxiliary rewind roll which makes it possible to rewind the slit web portions on opposed core shafts in alternating sets of bobbins all wound in the same direction. This feature not only results in forming all of the bobbins uniformly with one side of the paper (i. e., wire side or top side) disposed outwardly, but also improves the operation of the slitting knives.

These and other features of the present invention are described in further detail below in connection with the accompanying drawing, in which:

Fig. 4 is a central vertical section corresponding generally to Fig. 1;

Fig. 6 is an enlarged sectional detail taken substantially on the line 6—6 in Fig. 1, and illustrating the arrangement of the core shafts and the pivoted core shaft supporting arms;

Fig. 7 is an enlarged detail taken substantially on the line 7—7 in Fig. 3, and consisting essentially of a side elevation of the left pivoted supporting arm for the rear core shaft as seen in Fig. 3;

Fig. 8 is a similar enlarged detail of the right pivoted supporting arm for the rear core shaft as seen in Fig. 3;

Fig. 9 is an enlarged horizontal section of the supply roll core shaft arrangement, as seen in Fig. 2; and Fig. 10 is a fragmentary detail taken substantially on the line 10—10 in Fig. 9.

Figure 1:
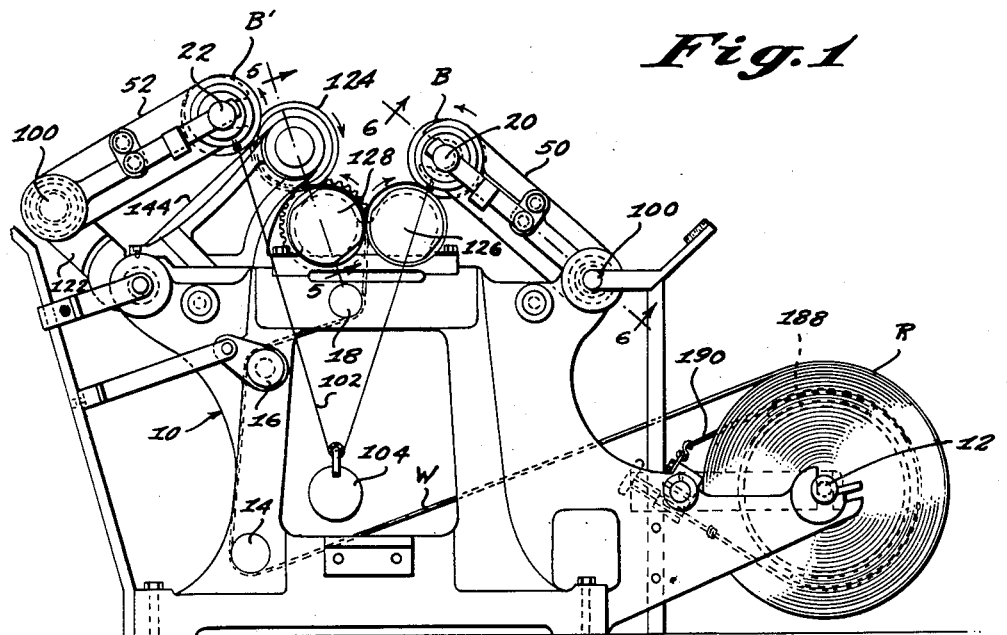
Fig. 1 is a side elevation of a slitting machine embodying the present invention.

The slitting machine shown in the drawing is of a generally conventional type in which a machine frame 10 is arranged to support a core shaft 12 for a supply roll R from which a web W may be trained through the machine, as over guide rolls at 14, 16 and 18, for slitting into smaller web portions and rewinding into bobbins as at B and B'. The improved arrangements of the operating elements provided by the present invention may be illustrated conveniently in relation to a slitting machine of this type, although, as mentioned above, these arrangements may also be employed in other types of web processing equipment, if desired.

According to the present invention, the core shafts 20 and 22, provided for rewinding the bobbins B and B', and which constitute operating elements that must be removable, are provided with specially arranged locating devices for maintaining the bobbins in accurate alignment in the machine so that they will be wound straight and true during the slitting operation. The arrangement of the core shafts in this manner is shown best in Fig. 6 of the drawing, in which an enlarged detail of the core shaft 20 is illustrated, and which corresponds exactly with the arrangement of the core shaft 22. As shown in Fig. 6, the core shaft 20 suitably comprises a cylindrical shell member 24 of suitable proportions for carrying the paper cores or liners P on which the bobbins B and B' are received during rewinding, and which are commonly positioned by intermediate spacers as at S.

The core shaft shell member 24 is fitted at each end with plug members 26 formed to extend at each end of the core shaft 20 so as to provide journal portions as at 28 and 30. Adjacent each of the shell members 24 these plug members are also formed with a threaded portion as at 32 to receive a retaining plate 34 and a nut element 36 by which the paper cores P and spacers S may be clamped in position on the core shaft 20. The retaining plates 34 are also preferably fitted with extending pins or dowels 38 disposed to be slidingly received in apertures 40 formed in the core shaft shell member 24 so that any turning movement of the retaining plates 34 with respect to the shell member 24 is prevented and loosening of the nut elements 36 during the slitting operation is thereby avoided.

The above noted journal portions 28 and 30 of the core shaft 20 are each fitted with double flanged rotatable sleeve or collar units as at 42 and 44. The sleeve unit 42 is fixed permanently in place on the journal portion 28, as will be pointed out more in detail presently, while the other sleeve unit 44 is fitted with a spring pressed ball member as at 46, or other similar yieldable means, adapted to engage a circumferential groove as at 48 in the journal portion 30 and thereby provide for mounting and removal of the sleeve unit 44 at this end of the core shaft 20 as desired. The sleeve unit 44 is made removable in this manner so as to facilitate mounting of the paper cores P and removal of the rewound bobbins B from the core shaft 20 as necessary.

These rotatable sleeve units 42 and 44 are arranged on the journal portions 28 and 30 with a lateral spacing in relation to the core shaft 20 adapting them for disposition on pivoted supporting arms 50 and 52 carried by the machine frame 10. These supporting arms 50 and 52 are bifurcated at their extending ends as at 54 and 56, such as is usual in slitting machines of this type, to receive the core shaft 20, and the rotatable sleeve units 42 and 44 are adapted for disposition in these bifurcated ends 50 and 52 as journal bearings for the core shaft 20.

It has already been noted above that the rotatable sleeve unit 42 is fixed permanently on the journal portion 28. This permanently fixed disposition of the sleeve unit 42 is used for locating and aligning the core shaft with respect to the frame structure 10 of the slitting machine. The rotatable sleeve unit 42 is permanently fixed on the journal portion 28 by seating it against a shoulder formed at 58 on the journal portion 28 and containing it against this shoulder by a collar 60 which is pinned on the journal portion as at 62. This containing collar 60 is further fitted with a thrust bearing unit 64 so as to allow for rotation of the sleeve unit 42 under the containing pressure of the collar member 60. The extending end of the journal portion 28 is further fitted with a centrally disposed pin element 66, which is preferably formed with a knurled tip as at 66', and which is provided to receive the locating pressure on the core shaft 20 for positioning a flange portion of the sleeve unit 42 against the supporting arm 50 as at 68 to locate the core shaft 20 with respect to the machine frame 10, as previously mentioned.

The locating or positioning pressure is exerted on the core shaft 20 through the pin element 66 by a locating device carried on the supporting arm 50, which comprises a swinging arm 70 mounted on a pivot rod 72 extending from the supporting arm 50. The swinging arm 70 is braced by a second rod 74, which is also mounted on the supporting arm 50, and which is fitted with an extending lip at 76 to accommodate swinging movement of the above mentioned swinging arm 70, and further to act as a rest for the arm 70 when the locating device is disengaged from the core shaft 20. The free end of the swinging arm 70 is fitted with a sliding plug unit 78, which is assembled with a threaded stem 80 that engages and extends through a positioning cap 82 to carry an adjusting handle at 84 and a locknut at 86. The other end of the plug unit 78 is joined through a universal joint as at 88 to a positioning nose 90, which is fitted with a thrust bearing unit 92 having a central aperture in its outer face that may also be suitably knurled to engage the knurled tip 66' of the pin element 66 disposed at the end of the journal portion 28 of the core shaft 20.

This arrangement allows the positioning nose 90 to be adjusted against the pin element 66 by manipulation of the adjusting handle 84 to exert the necessary locating pressure on the end of the core shaft 20, and when this locating pressure has been properly adjusted, the adjustment may be fixed by the locknut 86. The positioning nose 90 is connected to the plug unit 78 by the universal joint 88 to allow the positioning nose 90 freedom for finding a proper fit with the pin element 66 at the end of the core shaft 20, and so that any minor misalignment of the locating device with the core shaft 20 will not affect the smooth running of the core shaft 20. In order to maintain the positioning nose 90 in general position for finding the pin element at the end of the core shaft 20, a guiding cup 94 is fitted on the swinging arm 70 in loosely surrounding relation to the positioning nose 90 as shown in Fig. 6.

The pivoted supporting arms 50 and 52 as already noted have bifurcated extending ends 54 and 56 for supporting the core shaft 20, as is usual in slitting machines of this type, and these pivoted supporting arms form floating support means as is also usual in such slitting machines to allow the displacement necessary for accommodating the increasing diameter of the bobbins B and B' as they build up on the core shafts 20 and 22 during the slitting operation. The pivoted supporting arms 50 and 52, however, are uniquely formed according to the present invention for mounting on the machine frame 10. As is shown at Fig. 6, both of the pivoted supporting arms 50 and 52 flare outwardly at their pivoted ends to a hub portion 96, which is formed to straddle the frame structure 10, and which is fitted at each end with ball bearing units 98 for mountings on a pivot shaft 100 carried by the frame structure 10. As will be seen, this arrangement of the hub portion 50 allows a relatively wide spacing of the bearing units 98 and thereby provides exceptional strength for the supporting arms 50 and 52 against lateral stresses.

It is further important to impose a drag on the pivoting movement of these supporting arms 50 and 52 in order to prevent chattering of the core shafts during the slitting operation. The supporting arms are normally weighted during the slitting operation by cords 102 running to a hanging weight 104, as shown in Fig. 1, but it is still necessary to impose a drag at the point of pivoting of these arms in order to obtain fully satisfactory operation. This is done according to the present invention by arranging friction elements, such as disks of friction material as at 106 and 108, on the supporting arm pivot shaft 100 adjacent the hub portion 96, and providing means assembled on the pivoting shaft 100 for applying the friction elements 106 and 108 to the hub portion 96 and thereby imposing the necessary drag on the pivoting movement of the supporting arms 50 and 52.

The means employed for applying these friction elements 106 and 108 suitably comprises an externally threaded collar 110 fixed on the pivot shaft 100 as by set screws 112, and carrying at least two internally threaded collars 114 and 116 on its threaded surface. The fixed threaded collar 110 is further formed with a keyway as at 118 in its threaded surface, and carries a washer element 120 which is formed with a lug as at 120' for engaging the keyway 118. By this arrangement, the washer 120 is prevented from turning with respect to the collar 110, and by interposing this washer 120 between the internally threaded collars 114 and 116 carried on the collar 110, the friction elements 106 and 108 can be applied to the hub portion 96 with the desired pressure and locked in place effectively.

As indicated in Fig. 6, this arrangement for imposing a drag on pivoting movement of the supporting arms is exactly the same for each of the supporting arms 50 and 52. Also, the pivoted supporting arms are provided in corresponding pairs 50 and 52 for each of the core shafts 20 and 22, and these pairs of pivoted supporting arms 50 and 52 are mounted on exactly similar pivot shafts 100, which in turn are carried by the machine frame 10 in exactly the same manner with the single exception that the machine frame 10 is fitted according to the present invention with extension brackets 122 to carry one of these pivoting shafts 100. These extension brackets may be provided for carrying either of the pivoting shafts 100 as desired. In the drawings, they are shown provided for the pivot shaft carrying the supporting arms for the core shaft 22.

The purpose of providing these extension brackets 122 on the machine frame 10 is to arrange one of the pivot shafts 100 to carry a pair of the supporting arms 50 and 52 so as to support one of the core shafts, as 22, in relation to an auxiliary rewind roll 124, as illustrated in Figs. 1 to 5 inclusive. Normally, in a slitting machine of this type, the bobbins B and B' are rewound through peripheral contact with the slitting knife shafts 126 and 128, just as the bobbins B, being rewound on the core shaft 20, are shown resting on the knife shaft 126.

Figure 5:
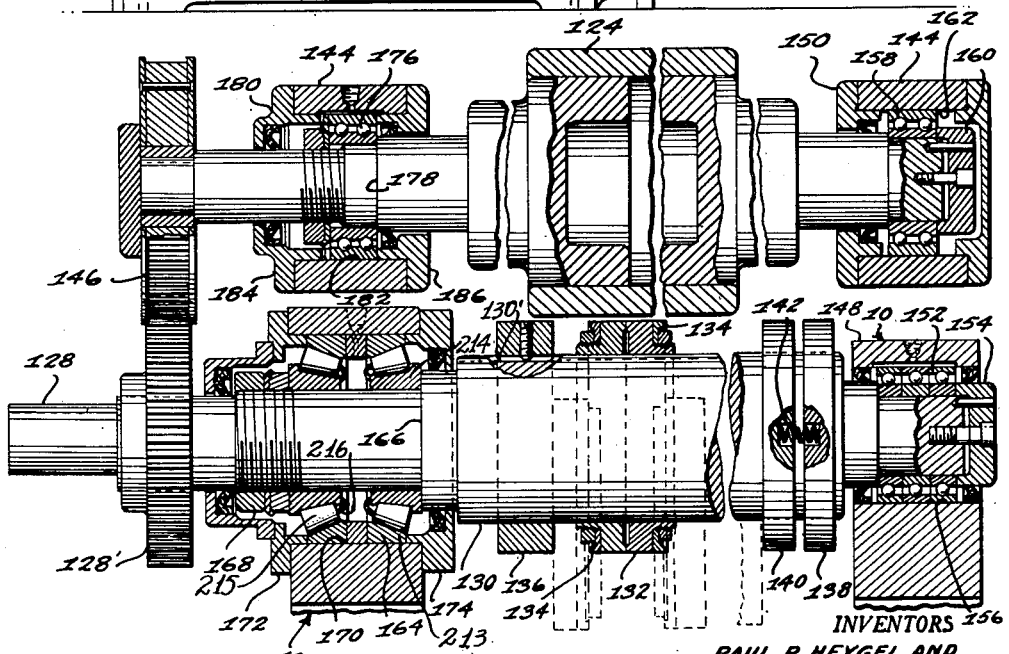
Fig. 5 is an enlarged sectional detail taken substantially on the line 5—5 in Fig. 1, and illustrating the arrangement of the slitting knives and the auxiliary rewind roll.
Figure 2:
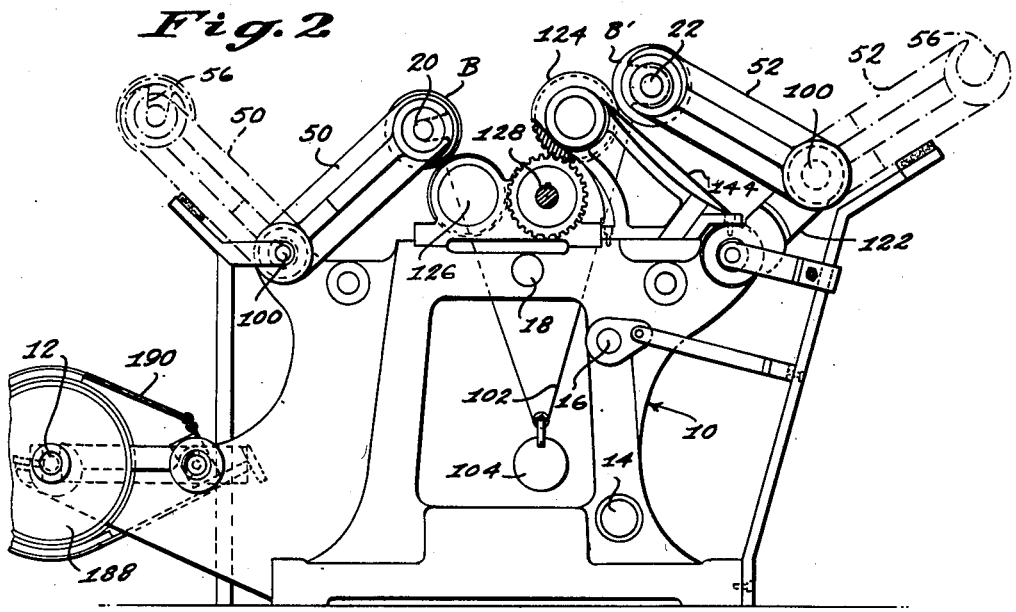
Fig. 2 is a further side elevation from the opposite side as compared with Fig. 1.
Figure 3:
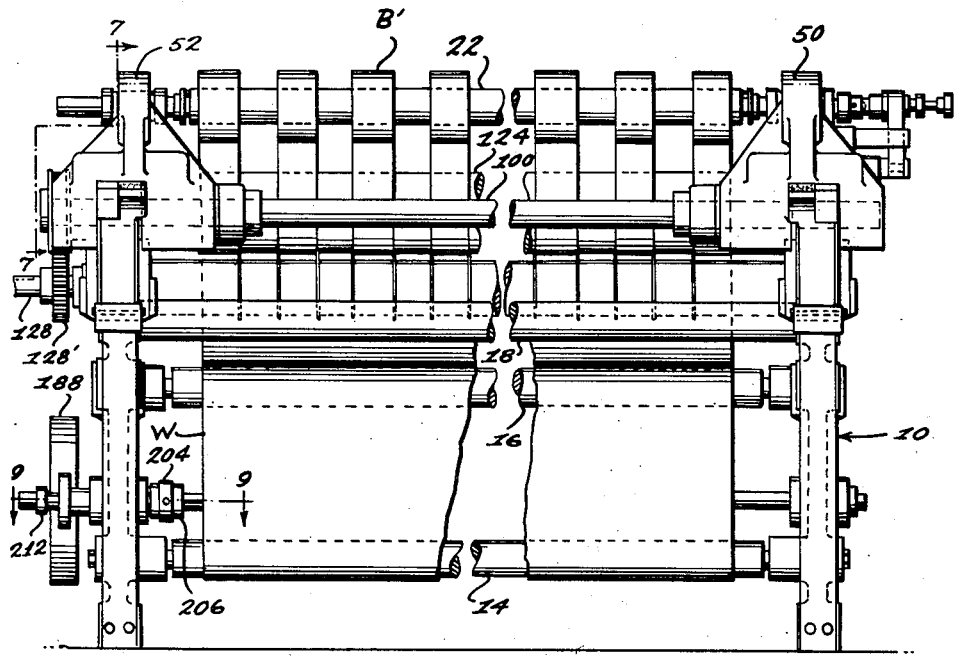
Fig. 3 is an end elevation from the right as seen in Fig. 2.

According to the usual and conventional arrangement these slitting knife shafts are arranged, as indicated best in Fig. 5, with a mandrel body 130 carrying spacing collars 132 on which circular slitting knives are mounted as at 134. The mandrel body 130 is formed with a keyway as at 130' so that the spacing collars 132 and the slitting knives 134 which they carry may be keyed for rotation with the knife shaft but still remain free for lateral sliding movement. At one end of the mandrel body 130, a fixed retaining collar 136 is provided, and at the other end a pair of retaining collars 138 and 140 are arranged. Of this pair of retaining collars, one of the collars 138 is fixed to the mandrel body 130, while the other collar 140 is laterally slidable, and annularly spaced spring elements 142 are arranged between these two collar elements so as to provide yieldable positioning pressure on the spacing collars and thereby allow them to find their proper running position when the two knife shafts 126 and 128 are disposed in the machine frame 10 with the circular slitting knives 134 on the two knife shafts 126 and 128 positioned alternately for coaction during the slitting operation, as indicated by dotted lines in Fig. 5.

As will be seen, the peripheral surface of the spacing collars 132 and the slitting knives 134 which they carry provide a supporting surface for the bobbins on shaft 20 that are being rewound after the slitting operation, and as previously mentioned it is usual practice to rewind the bobbins by peripheral contact with these spacing collars and slitting knives. The slitting knife shafts 126 and 128, however, must be geared to run together during the slitting operation, and as a result when the bobbins are rewound by peripheral contact with the knife shafts they are of necessity rewound in opposite directions, which means that opposite sides of the sheet material being processed will be disposed outwardly on the two sets of bobbins obtained. For example, if the sheet material being processed is paper, the top side of the sheet will be disposed outwardly on one set of bobbins while it will be the wire side that is disposed outwardly on the other set of bobbins. It is often important to avoid this result in rewinding the bobbins in order to obtain fully uniform bobbins for subsequent processing operations. Where a web of cigarette paper, for instance, is being slit and rewound into bobbins intended for use on cigarette making machines, the bobbins can be handled to much better advantage in the cigarette making machines if one side of the paper is uniformly disposed outwardly on the bobbins.

This result is obtained according to the present invention by employing the above mentioned auxiliary rewind roll 124 which is mounted on the machine frame 10 by a bracket structure as at 144 to support the bobbins B' carried by the core shaft 22 and lead the slit paper webs from the knife shaft 128 onto these bobbins B' for rewinding in the same direction as the bobbins B being rewound through peripheral contact with the knife shaft 126. The auxiliary rewind roll 124 is fitted with a gear 146 which meshes with the gear 128' on the knife shaft 128 so that it is driven at the same peripheral speed. Also, it will be noted from Fig. 5 that the auxiliary rewind roll 124 is spaced slightly from the knife shaft 128, which provides the further advantage of relieving the spacing collars 132 and the slitting knives 134 on the knife shaft 128 of the pressure resulting from supporting the bobbins B' during the rewinding operation, and thereby leaves the spacing collars 132 free to shift laterally on the mandrel body 130 of the knife shaft 128 to find their proper running position with the knife 134 carried by the other knife shaft 126.

It should also be noted that both of these knife shafts 126 and 128, as well as the auxiliary rewind roll 124, are mounted so that they too are aligned from only one side of the machine frame 10. The knife shafts 126 and 128, and the auxiliary rewind roll 124, do not require a removable mounting, as do the core shafts 20 and 22, so that they are assembled in fixed relation with the machine frame 10. As shown in Fig. 5, the mounting arrangements for these elements comprise bearing units 148 and 150 arranged at one side of the machine frame 10 with clearance for lateral shifting. In the case of the knife shaft 128 (or the knife shaft 126), the bearing assembly 148 comprises ball bearing units 152 assembled on the end of the knife shaft 128 by a cap 154. The outer races of these ball bearing units 152 are in turn supported in a bore as at 156 provided in the machine frame 10. In the case of the auxiliary rewind roll 124 a similar ball bearing unit 158 is assembled at the end of the shaft by a cap 160 and arranged in a bore 162 formed in the previously mentioned bracket structure 144.

At the other end of the knife shaft 128 (or 126), a double thrust bearing unit, such as the TIMKEN type arrangement broadly illustrated as 164, is seated against a shoulder 166 and held in place by locknuts as at 168. Bearing 164 has component parts outer race 213, inner race 214 and rollers 215 held in place by roller cages 216. This TIMKEN type bearing unit 164 is also disposed in a bore 170 provided in the machine frame 10, but this bore 170 is further fitted with positioning caps 172 and 174 which engage the outer race of the bearing unit 164 to fix it accurately at a desired alignment for the knife shaft 128 in the machine frame 10. The arrangement for the auxiliary rewind roll 124 is generally similar although it is not usually necessary to provide any special thrust support for this roll, and an ordinary ball bearing unit 176 may accordingly be used at this end of the shaft too. Here again the bearing unit 176 is seated against a shoulder 178 and held in place by a nut 180, while the outer race of the bearing unit 176 is positioned in a bore 182 with which positioning caps 184 and 186 are used to fix the bearing unit 176 in place.

The alignment of all the operating elements of the slitting machine of the present invention form one side of the machine frame 10 is further carried out in the mounting arrangement for the supply roll R. As previously noted, this supply roll R is carried by a core shaft 12, and this core shaft 12 may be fitted, as is common, with a brake drum 188 for action with an adjustable braking means as at 190 to impose proper tension on the web being withdrawn from the supply roll R, and to prevent the supply roll R from over-running whenever it is necessary to shut down the machine during the slitting operation. The supply roll core shaft 12 is formed with keyways as at 192 so that the brake drum 188 may be fixed in place as indicated at 194 in Fig. 9, and also to provide for receiving laterally slidable double flanged rotatable collars or sleeves 196 at each end of the core shaft 12 that are adapted for disposition in the machine frame 10 as journal supports for the core shaft. At one end the core shaft 12 is also fitted with a rotatable collar 198 which is seated against a shoulder 200 and secured in place by a locknut 202. A positioning arm 204 which is pivoted on the machine frame is arranged to engage the bearing collar 198 as illustrated in Fig. 10. This positioning arm 204 is carried on a pivot stud 206 which is mounted for lateral sliding adjustment in a bore 208 provided in the machine frame 10, by means of a screw stem 210 which is fitted with a manipulating handle at 212. As the rotatable collar 198 is fixed on the core shaft 12, lateral adjustment of the positioning arm 204 will result in aligning the supply roll R in machine frame 10, as desired, in relation to the knife shafts 126 and 128, the auxiliary rewind roll 124, and the core shafts 20 and 22, which may all be aligned on the machine frame 10 with similar accuracy and facility according to the present invention as previously pointed out.

We claim:

1. In a slitting machine, the combination with a machine frame incorporating opposed pairs of pivoted supporting arms forming floating support means for core shafts provided for receiving web portions slit on said machine and rewinding said web portions into alternating sets of bobbins, of an auxiliary rewind roll carried by said machine frame for one of said core shafts, said auxiliary rewind roll being driven in a direction resulting in rotation of the core shaft for which it is provided in the same direction as the other core shaft.

2. In a slitting machine, the combination with a machine frame incorporating opposed pairs of pivoted supporting arms forming floating support means for core shafts provided for rewinding web portions slit on said machine, and carrying opposed knife rolls for slitting said web into portions, of an auxiliary rewind roll carried by said machine frame for peripheral contact with one of said core shafts, said auxiliary rewind roll being driven in a direction resulting in rotation of the core shaft for which it is provided in the same direction as the other core shaft is rotated through normal peripheral contact with one of said knife rolls.

3. In a slitting machine, the combination with a machine frame incorporating opposed pairs of pivoted supporting arms forming floating support means for core shafts provided for rewinding into alternating sets of bobbins web portions slit on said machine, and carrying opposed knife rolls each fitted with a gear meshing with the other for driving said rolls to slit said web into portions, of an auxiliary rewind roll carried by said machine frame for peripheral contact with bobbins being rewound on one of said core shafts, said auxiliary rewind roll also being fitted with a gear meshing with the gear on one of said knife rolls, whereby said rewind roll is driven in a direction resulting in rotation of the core shaft with which it is associated in the same direction as the other core shaft is rotated through normal peripheral contact of the bobbins being rewound on this core shaft with the other of said knife rolls.

4. In a slitting machine, the combination with a machine frame incorporating means for supporting bobbins while they are being formed by rewinding web portions slit on said machine, and carrying means for slitting said web into portions, of a core shaft for a web supply roll, said core shaft being fitted with laterally slidable and rotatable sleeves adjacent each end adapted for disposition on said machine frame as journal bearings for said core shaft, and said core shaft being further fitted with a fixed rotatable collar, and laterally adjustable locating means disposed on said machine frame for engaging said rotatable collar and thereby laterally locating said core shaft on said machine frame.

5. In a slitting machine, the combination with a machine frame incorporating means for supporting bobbins while they are being formed by rewinding web portions slit on said machine, means for slitting said web into portions, and means for supporting a web supply roll, of lateral locating devices disposed on said machine frame for aligning all of said means solely with respect to one side of said machine frame.

6. In a slitting machine, the combination with a machine frame incorporating means for supporting a web supply roll, means for slitting a web withdrawn from said supply roll support means into portions for forming bobbins, and means for supporting bobbins while they are being formed by rewinding said slit web portions, of adjusting means associated with said bobbin support means for lateral positioning thereof, and laterally adjustable locating means disposed on said machine frame for positioning said roll support means, whereby said bobbin support and said roll support means may be aligned on said machine frame for assuring accurate rewinding of said bobbins.

7. In a slitting machine, the combination with a machine frame incorporating movable means for supporting bobbins while they are being formed by rewinding web portions slit on said machine, and carrying means for slitting said web into portions, of adjusting means associated with said means for supporting said bobbin for lateral positioning thereof, friction elements associated with said movable bobbin support means for governing the rate of movement thereof, an auxiliary rewind roll carried by said frame for causing all of said bobbins to be wound in the same direction, a core shaft for a web supply roll adapted to be mounted on said frame, said core shaft being fitted with a fixed rotatable collar, and laterally adjustable locating means disposed on said machine frame for engaging said rotatable collar whereby said movable means for supporting bobbins, said auxiliary rewind roll, and said web supply roll may be aligned on said machine frame for assuring accurate rewinding of said bobbins.

References Cited in the file of this patent

UNITED STATES PATENTS

| | | |
|---|---|---|
| 929,876 | Pulsifer | Aug. 3, 1909 |
| 1,021,028 | Wescott | Mar. 26, 1912 |
| 1,515,382 | Cheesman | Nov. 11, 1924 |
| 1,948,385 | Lentz | Feb. 20, 1934 |
| 1,963,179 | Stacey | June 19, 1934 |
| 2,086,476 | Quick et al. | July 6, 1937 |
| 2,221,176 | Boll | Nov. 12, 1940 |
| 2,282,909 | Thiersch et al. | May 12, 1942 |
| 2,414,739 | Heygel | Jan. 21, 1947 |

FOREIGN PATENTS

| | | |
|---|---|---|
| 108,893 | Germany | Mar. 9, 1900 |